United States Patent
Nakane et al.

(10) Patent No.: US 7,429,435 B2
(45) Date of Patent: Sep. 30, 2008

(54) METHOD FOR PREPARING POSITIVE ELECTRODE ACTIVE MATERIAL FOR NON-AQUEOUS SECONDARY BATTERY

(75) Inventors: Kenji Nakane, Tsukuba (JP); Hiroshi Inukai, Tsuchiura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 60 days.

(21) Appl. No.: 10/394,049

(22) Filed: Mar. 24, 2003

(65) Prior Publication Data

US 2003/0180620 A1 Sep. 25, 2003

(30) Foreign Application Priority Data

Mar. 25, 2002 (JP) ............................. 2002-082968
Oct. 10, 2002 (JP) ............................. 2002-297239

(51) Int. Cl.
*H01M 4/58* (2006.01)
*H01M 6/00* (2006.01)

(52) U.S. Cl. .............................. 429/231.95; 429/231.9; 429/231.1; 429/231.3; 29/623.1

(58) Field of Classification Search ............ 429/231.95, 429/231.9, 231.1, 231.3; 29/623.1
See application file for complete search history.

(56) References Cited

U.S. PATENT DOCUMENTS 5,620,812 A 4/1997 Tahara et al.
5,817,436 A * 10/1998 Nishijima et al. ............ 429/223

2005/0079416 A1 * 4/2005 Ohzuku et al. ............ 429/231.1

FOREIGN PATENT DOCUMENTS

| EP | 0 017 400 A1 | 10/1980 |
| EP | 0 017 400 B1 | 5/1984 |
| EP | 0 696 075 A2 | 2/1996 |
| EP | 0696075 A2 * | 2/1996 |
| EP | 0 782 206 A1 | 7/1997 |
| EP | 0 794 585 A1 | 9/1997 |
| EP | 1 189 296 A2 | 3/2002 |
| JP | 63-59507 B2 | 11/1988 |
| JP | 5-242891 A | 9/1993 |
| JP | 2002-42813 A | 2/2002 |
| JP | 2002-338250 A | 11/2002 |
| WO | 96/17392 A1 | 6/1996 |

(Continued)

OTHER PUBLICATIONS

Lu et al., "Layered Li[Ni$_x$Co$_{1-2x}$Mn$_x$]O$_2$ Cathode Materials for Lithium-Ion Batteries", *Electrochemical and Solid-State Letters*, vol. 4, No. 12, 2000, pp. A200-A203.

(Continued)

*Primary Examiner*—Patrick Joseph Ryan
*Assistant Examiner*—Angela J. Martin
(74) *Attorney, Agent, or Firm*—Sughrue Mion, PLLC

(57) ABSTRACT

There is provided a simple and easy method of preparation of a positive electrode active material for a non-aqueous secondary battery which comprises a compound comprising lithium, nickel and manganese and having a layered structure. Said method comprises firing a mixture of (1) at least one member selected from the group consisting of dinickel trioxide and boron compounds and (2) one or more metal compounds comprising lithium, nickel and manganese as their metal elements.

7 Claims, 6 Drawing Sheets

FOREIGN PATENT DOCUMENTS

| | | | |
|---|---|---|---|
| WO | WO 00/633923 A1 | | 10/2000 |
| WO | WO 01/48842 A1 | | 7/2001 |
| WO | WO 02/40404 A1 | | 5/2002 |
| WO | WO 02/073718 A1 | | 9/2002 |
| WO | WO02073718 | * | 9/2002 |
| WO | WO03003487 | * | 1/2003 |

OTHER PUBLICATIONS

Lu et al., "Layered Cathode Materials Li[Ni$_x$Li$_{(1/3-2x/3)}$ Mn$_{(2/3-x/3)}$]O$_2$ for Lithium-Ion Batteries", *Electrochemical and Solid-State Letters*, vol. 4, No. 11, 2001, pp. A191-A194.

Ohzuku et al. "Layered Lithium Insertion Material of LiCo$_{1/3}$ Ni$_{1/3}$ Mn$_{1/3}$ O$_2$ for Lithium-Ion Batteries", *Chemistry Letters*, Chem. Soc. Jpn., XP009015329, Jul. 2001, pp. 642-643.

Ohzuku et al., "Layered Lithium Insertion Material of LiNi$_{1/2}$ Mn$_{1/2}$ O$_2$: A Possible Alternative to LiCoO$_2$ for Advanced Lithium-Ion Batteries", *Chemistry Letters*, Chem. Soc. Jpn., XP009015047, Aug. 2001, pp. 744-745.

Macneil et al., "A comparison of the electrode/electrolyte reaction at elevated temperatures for various Li-ion battery cathodes", *Journal of Power Sources*, vol. 108, 2002, pp. 8-14.

T. Ohzuku et al., "Layered Lithium Insertion Material of LiCo$_{1/3}$ Ni$_{1/3}$ Mn$_{1/3}$ O$_2$ for Lithium-Ion Batteries", *Chemistry Letters 2001*, pp. 642-643.

T. Ohzuku et al., "Layered Lithium Insertion Material of LiNi$_{1/2}$ Mn$_{1/2}$O$_2$: A Possible Alternative to LiCoO$_2$ for Advanced Lithium-Ion Batteries", *Chemistry Letters 2001*, pp. 744-745.

Z. Lu et al., "New Layered Cathode Materials Li[Ni$_x$Li$_{(1/3-2x/3)}$Mn$_{(2/3-x/3)}$]O$_2$ and Li[Ni$_x$Co$_{1-2x}$Mn$_x$]O$_2$ for Lithium Ion Batteries", *42$^{nd}$ Battery Symposium of Japan* (2001), Abstract No. 2112, Nov. 21, 2001, pp. 42-43.

A. Ueda et al., "XAS studies of Li-Mn-Ni-O ternary compounds for Li-ion batteries", *42$^{nd}$ Battery Symposium of Japan* (2001), Abstract No. 2A01, Nov. 21, 2001, pp. 130-131.

Y. Makimura et al., "Synthesis and Characterization of Li-Ni-Mn Ternary Oxides", *41$^{st}$ Battery Symposium of Japan* (2000), Abstract No. 2D20, Nov. 20, 2000, pp. 460-461.

K. Honbo et al., "Thermal Stability of LiNi$_{1-x-y}$Co$_x$Mn$_y$O$_2$ as Positive Electrode Materials", *40$^{th}$ Battery Symposium of Japan* (1999), Abstract No. 1C12, Nov. 14, 1999, pp. 243-244.

Z. Lu et al., "Layered Cathode Materials Li[Ni$_x$Li$_{(1/3-2x/3)}$Mn$_{(2/3-x/3)}$Mn$_{(2/3-x/3)}$]O$_2$ for Lithium-Ion Batteries", *Electrochemical and Solid-State Letters*, vol. 4, No. 11, 2001, pp. A191-A194.

Z. Lu et al., "Li[Ni$_x$Co$_{1-2x}$Mn$_x$]O$_2$ Cathode Materials for Lithium-Ion Batteries", *Electrochemical and Solid-State Letters*, vol. 4, No. 12, 2001, pp. A200-A203.

D. Li et al., "Preparation and Electrochemical properties of LiNi$_{0.5}$Mn$_{0.5-x}$Ti$_x$O$_2$", *69$^{th}$ Battery Society Symposium* (2002), Abstract No. 2H06, Mar. 25, 2002, p. 213.

D. Li et al., "Preparation and Electrochemical properties of LiNi$_{0.5}$Mn$_{0.5-x}$Ti$_x$O$_2$", *43$^{rd}$ Battery Society Symposium* (2002), Abstract No. 2H06, Mar. 25, 2002, p. 213.

\* cited by examiner

METHOD FOR PREPARING POSITIVE ELECTRODE ACTIVE MATERIAL FOR NON-AQUEOUS SECONDARY BATTERY

BACKGROUND OF THE INVENTION

1. Field of the Invention

This invention relates to a method for preparing a positive electrode active material for a non-aqueous secondary battery.

2. Description of Related Art

In a non-aqueous secondary battery, a positive electrode active material is used.

With a rapid progress in the field of electronic instruments toward portable and/or cordless ones, development of non-aqueous secondary batteries which can realize the desire for batteries which are smaller in size, lighter in weight and have higher capacity than previous secondary batteries has been forwarded. Among them, lithium secondary batteries are already used in practice as power sources for portable telephones, note-book sized personal computers, and the like and, further, investigation is being made to attain a larger size and higher output batteries to be used as power sources for automobiles and for communication power backup.

For a positive electrode active material for non-aqueous secondary batteries, there has hitherto been used, for example, spinal type lithium manganese oxide; but a positive electrode active material which can provide a non-aqueous secondary battery having a higher capacity has been eagerly awaited.

Under such situations, novel compounds or the like which are compounds comprising lithium, nickel and manganese and having a layered structure and are represented by the composition formula $LiCo_{1/3}Ni_{1/3}Mn_{1/3}O_2$ (Chemistry Letters, Chem. Soc. Jpn., July 2001, p. 642) or $LiNi_{1/2}Mn_{1/2}O_2$ (Chemistry Letters, Chem. Soc. Jpn., August 2001, p. 744) or by the formula $Li[Ni_xLi_{(1/3-2x/3)}Mn_{(2/3-x/3)}]O_2$ ($0 \leq x \leq 1/2$) or $Li[Ni_xCo_{1-2x}Mn_x]O_2$ ($0 < x \leq 1/2$) (preliminary papers for 42nd battery symposium, Nov. 21, 2001, lecture no. 2I12) have been proposed as a positive electrode active material for a non-aqueous secondary battery which can possibly solve the above-mentioned problems and have been attracting attention. The "layered structure" herein refers to a structure wherein the crystal structure is identified as the $\alpha$-$NaFeO_2$ type by X-ray diffraction (Electrochemical and Solid-State Letters (USA), Electrochemical Society, Inc., December 2001, vol. 4, p. A200-A203).

As the nickel source and manganese source for synthesizing these compounds, since it has previously been considered that the above-mentioned compounds having a layered structure cannot be obtained by using a nickel compound and a manganese compound as a mixture thereof, there have been used complex hydroxides of nickel with manganese. However, since divalent manganese in the comlex hydroxide is easily oxidized into trivalent state, the conditions of synthesis of the complex hydroxide and the atmosphere in which subsequent handling thereof is conducted both need to be controlled strictly and hence the complex hydroxide has been difficult to prepare. Accordingly, a simple and easy method for preparation which does not need strict control of atmosphere has been eagerly awaited.

The object of this invention is to provide a simple and easy method for preparing a positive electrode active material for a non-aqueous secondary battery which comprises a compound comprising lithium, nickel and manganese and having a layered structure, a positive electrode active material for a non-aqueous secondary battery obtained by the method, and a non-aqueous secondary battery which uses the positive electrode active material.

The present inventors have made extensive study on the method for preparing a positive electrode material for a non-aqueous secondary battery which comprises a compound comprising lithium, nickel and manganese and having a layered structure by firing a mixture which is a mixture of metal compounds and comprises lithium, nickel and manganese. As the result, the inventors have found that when a mixture furhter containing at least one member selected from the group consisting of dinickel trioxide and boron compounds is used, the intended positive electrode active material can be prepared in a simple and easy way, without requiring strict control of atmosphere, by mere firing. This invention has been completed on the basis of above finding.

Thus, according to this invention, there is provided a method for preparation of a positive electrode active material for a non-aqueous secondary battery comprising a step of firing a mixture of (1) at least one member selected from the group consisting of dinickel trioxide and boron compounds and (2) one or more metal compounds comprising lithium, nickel and manganese as their metal elements, and a step of obtaining a compound comprising lithium, nickel and manganese and having a layered structure.

DETAILED DESCRIPTION OF THE INVENTION

Figure 1:
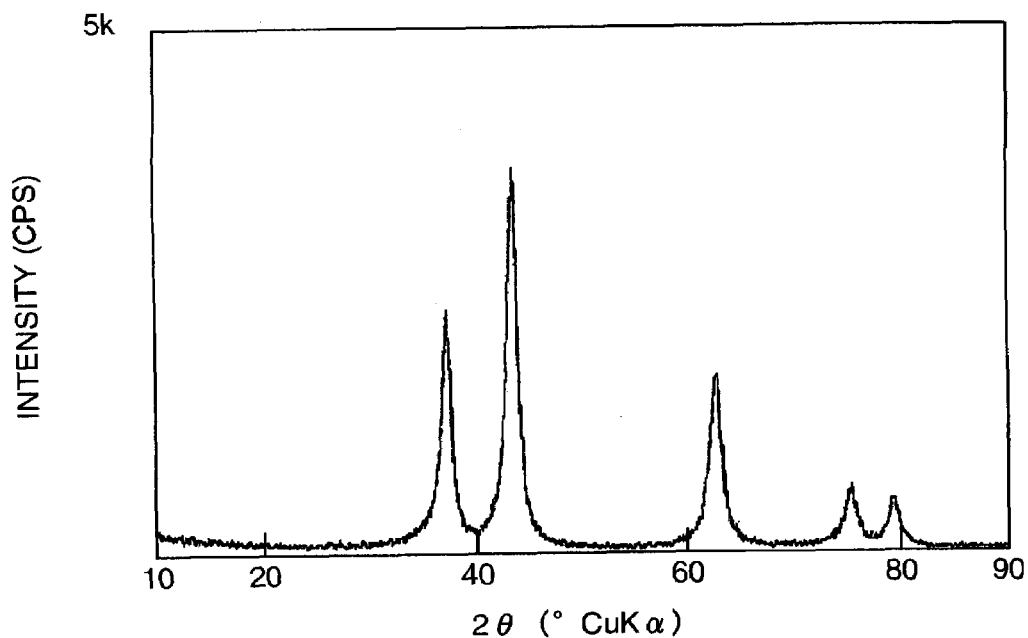
FIG. 1 is a graph showing the result of powder X-ray diffraction measurement of dinickel trioxide used in Examples 1, 2, 3, 4, 6 and 7.

This invention provides a method for preparing a positive electrode active material for a non-aqueous secondary battery comprising a step of firing a mixture of (1) at least one member selected from the group consisting of dinickel trioxide and boron compounds and (2) one or more metal compounds comprising lithium, nickel and manganese as their metal elements, and a step of obtaining a compound comprising lithium, nickel and manganese and having a layered structure.

Preferably, this invention comprises a step of firing a mixture of (1) dinickel trioxide and (2) one or more metal compounds comprising lithium and manganese, more preferably lithium, manganese and cobalt as their metal elements.

Further, preferably, this invention comprises a step of firing a mixture of (1) a boron compound and (2) one or more metal compounds comprising lithium, nickel and manganese, more preferably lithium, nickel, manganese and cobalt as their metal elements.

For preparing the above-mentioned mixture in a most simple and easy way, it suffices to mix at least one member selected from the group consisting of dinickel trioxide and boron compounds with a lithium compound, nickel compound and manganese compound and preferably, additionally with a cobalt compound.

The term "dinickel trioxide" used in this invention not only signifies a compound represented strictly by the composition formula $Ni_2O_3$ but also includes nickel oxides having a nickel content less than 78.6% by weight (which signifies a molar ratio Ni/O less than 1). Dinickel trioxide is commercially available on the market. Some of the dinickel trioxide available on the market gives an X-ray diffraction measurement result different from that of $Ni_2O_3$ shown in JCPDS Card No. 14-0481, giving a powder X-ray diffraction pattern near to that of NiO shown in said Card No. 4-0835; however, so long as the nickel content is less than 78.6% by weight, the compound corresponds to dinickel trioxide in the method of preparation of this invention.

The boron compounds may be, for example, various boric acid salts, such as diboron trioxide, boric acid (orthoboric acid), metaboric acid, tetreboric acid and lithium borate, and boron of simple body. Preferred of these boron compounds is boric acid (orthoboric acid) from the viewpoint of being suited to a dry mixing process. The content of the boron compound in the mixture is preferably 0.1-10% by mole relative to the number of mole of lithium in the mixture. When the content is less than 0.1% by mole, the formation of the compound having a layered structure is apt to be insufficient, which is unfavorable. When the content exceeds 10% by mole, when the compound is used in a battery, the overvoltage tends to increase and the discharging capacity tends to decrease particularly at low temperature.

The lithium compound, nickel compound, manganese compound, and cobalt compound may be, for example, the oxides, hydroxides, oxyhydroxides, carbonates, nitrates, acetates, chlorides, organometallic compounds and alkoxides of these metals.

Though this invention does not exclude the use of complex metal compounds comprising two or more metal elements selected from the group consisting of lithium, nickel and manganese, e.g., complex hydroxides of nickel and manganese, this invention is particularly advantageous in point of making it possible to prepare the objective compound in a simple and easy manner by using metal compounds comprising a single metal element, e.g., lithium compounds, nickel compounds and manganese compounds.

When dinickel trioxide alone is used from the group consisting of dinickel trioxide and boron compounds, the nickel source is preferably substantially wholly dinickel trioxide. Namely, a metal compound comprising nickel is preferably also dinickel trioxide.

The method used for mixing these metal compounds may be known ones. Though the mixing may be conducted both by a dry method and a wet method, a dry mixing method, which is simpler and easier, is preferable. The dry mixing may be conducted by industrially conventional known methods, for example with a V type blender, W type blender, ribbon blender, drum mixer, and dry ball mill.

As described above, a metal compound mixture comprising, for example, lithium, nickel, manganese and boron can be prepared by mixing a lithium compound, nickel compound, manganese compound and boron compound, but the method for preparing the mixture is not particularly limited in this invention. For example, in the above-mentioned example, there may be used a method for preparation which comprises removing water from an aqueous solution containing lithium, nickel, manganese and boron and a method which comprises dropwise adding an aqueous alkali solution into an aqueous solution containing nickel and manganese to obtain a precipitate containing nickel and manganese, and then mixing the precipitate with a lithium compound and boron compound.

The mixture thus obtained is compression-molded according to necessity, and then fired while being kept in a temperature range of preferably not lower than 600° C. and not higher than 1200° C., more preferably in a temperature range of not lower than 800° C. and not higher than 1000° C., for 2 hours to 30 hours, whereby a positive electrode active material for a non-aqueous secondary battery comprising a compound comprising lithium, nickel and manganese and having a layered structure can be prepared. At the time of the preparation, it is preferable to attain the temperature to be kept as rapidly as possible within a range which does not cause breakage of the firing vessel. The firing atmosphere used may be any of the inert atmosphere, such as nitrogen and argon; oxidizing atmosphere, such as air, oxygen, oxygen-containing argon and oxygen-containing nitrogen; and reducing atmosphere, such as hydrogen-containing nitrogen and hydrogen-containing argon, but an oxidizing atmosphere is preferred. After firing, the fired product can be adjusted to a desired particle size by industrially conventional known methods, for example with a vibration mill, jet mill, and dry ball mill.

The positive electrode active material for a non-aqueous secondary battery in this invention comprises a compound comprising lithium, nickel and manganese and having a layered structure. The compound is preferably one which is identified in X-ray diffraction as a compound represented by the composition formula $$Li[Ni_{(x-y)}Li_{(1/3-2x/3)}Mn_{(2/3-x/3-y)}Co_{2y}]O_2 \tag{I}$$

wherein $0<x\leq0.5$, $0\leq y\leq1/6$, $x>y$.

It is preferable that, in the composition formula (I), y is greater than 0, i.e., Co is contained because then the discharge capacity and the cycle characteristic at room temperature is improved. Further, it is preferable that, in the composition formula (I), x is smaller than 0.5, i.e., Ni content is smaller than Mn content and Li is contained in the transition metal site, because then the cycle characteristic at high temperature is improved. When x decreases, discharge capacity tends to decrease, therefore $0.4<x<0.5$ is preferable as the range of x, more preferably $y>0$ at the same time. The respective sites of lithium, nickel, manganese and cobalt may be replaced with Na, K, Mg, Ca, Sr, Ba, B, Al, Ga, In, Si, Zr, Sn, Ti, V, Cr, Fe, Cu, Ag, Zn, etc. within the range of not more than 50% by mole of the respective sites. Further, as to oxygen, it may be replaced with a halogen, sulfur and nitrogen within the range of not more than 5% by mole so long as the crystal structure does not change and the resulting product is a compound which is identified in X-ray diffraction as a compound represented by the composition formula (I). The replacing method is not particularly limited and conventional known methods can be used.

Hereunder, with reference to a case where the positive electrode material for a non-aqueous secondary battery of this invention is used for the positive electrode of a lithium secondary battery, a suitable constitution for making a battery will be explained.

A positive electrode for a lithium secondary battery which is one embodiment of this invention can be produced by supporting on a positive electrode current collector a positive electrode mix containing the active material for a non-aqueous secondary battery of this invention and additionally a carbonaceous material as a conductive material, a binder, or the like.

The carbonaceous material may be, for example, natural graphite, artificial graphite, cokes, and carbon black. These can be used as a conductive material each alone or as a mixture of, for example, artificial graphite with carbon black.

As the binder is usually employed thermoplastic resins. Specific examples of the resins used include poly(vinylidene fluoride)(hereinafter sometimes referred to as "PVDF"), polytetrafluoroethylene (hereinafter sometimes referred to as "PTFE"), tetrafluoroethylene-hexafluoropropylene-vinylidene fluoride copolymer, hexafluoropropylene-vinylidene fluoride copolymer, and tetrafluoroethylene-perfluorovinyl ether copolymer. They may be used each alone or in admixture of two or more thereof.

When a fluororesin and a polyolefin are used together as binders in combination with the positive electrode active material of this invention such that the proportion of the fluororesin in the positive electrode mix is 1-10% by weight and that of the polyolefine is 0.1-2% by weight, adhesion to the current collector is excellent and safety from external heating is further improved.

Al, Ni, stainless steel, etc. can be used for the positive electrode current collector; Al is preferred because it can be easily worked into a thin sheet and is inexpensive. The methods used for supporting the positive electrode mix on the positive electrode current collector include a method of compression molding, and a method of making the positive electrode mix into paste by using a solvent or the like, coating the paste on the positive electrode current collector, drying the coat and then pressing the collector to adhere the coat.

As to the negative electrode material of a lithium secondary battery which is one embodiment of this invention, there may be used, for example, lithium metal, lithium alloys or materials capable of being doped/undoped with lithium ions. As examples of the materials capable of being doped/undoped with lithium ions, mention may be made of carbonaceous materials such as natural graphite, artificial graphite, cokes, carbon black, pyrolytic carbons, carbon fibers, and fired organic polymer compounds; chalcogen compounds such as oxides and sulfides capable of being doped/undoped with lithium ions at a potential lower than that of positive electrode; etc.

The form of the carbonaceous materials may be any of, for example, the flaky form such as of natural graphite, spherical form such as of mesocarbon microbeads, fibrous form such as of graphitized carbon fibers, or fine powder aggregates, and, if necessary, a thermoplastic resin as a binder may be added thereto. The thermoplastic resin may be, for example, PVDF, polyethylene and polypropylene.

The chalcogen compounds, such as oxides and sulfides, used as the negative electrode include, for example, oxides of the elements of groups 13, 14 and 15 of the periodic table. These compounds may also be incorporated according to necessity, with carbonaceous materials as conductive materials and thermoplastic resins as binders.

For a negative electrode current collector, Cu, Ni, stainless steel and the like can be used; particularly in lithium secondary batteries, Cu is preferred because it can hardly form alloys with lithium and, moreover, can be easily worked into a thin sheet. As to the method for supporting a mix containing a negative electrode active material on the negative electrode current collector, mention may be made of a method of compression molding and a method of making the negative electrode active material into a paste by using a solvent, etc., coating the paste on the current collector, drying the coat and then pressing the collector to adhere the coat.

For a separator used in a lithium secondary battery which is one embodiment of this invention, there may be used materials in the form of porous membrane, nonwoven fabrics and woven fabrics of, for example, polyolefine, such as polyethylene and polypropylene, fluororesin, nylon, aromatic aramid, etc. The thickness of the separator is preferably as thin as possible so far as necessary mechanical strength is kept, from the viewpoint of increasing the volume energy density of the battery and decreasing internal resistance, and is preferably about 10-200 μm.

The electrolyte used in the lithium secondary battery which is one embodiment of this invention may be known ones, for example, an electrolyte selected from either a non-aqueous electrolyte solution containing a lithium salt dissolved in an organic solvent or a solid electrolyte. The lithium salt may be $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, a lower aliphatic carboxylic acid lithium salt, $LiAlCl_4$, and the like, used each alone or as a mixture of two or more thereof.

The organic solvent used in the lithium secondary battery which is one embodiment of this invention may be, for example, carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyl-tetrahydrofuran; esters such as methyl formate, methyl acetate and γ-butyrolactone; nitrites such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propanesultone; and further, the above-mentioned organic solvents having a fluorine substituent further introduced therein; generally, they are used as a mixture of two or more thereof. Among them, mixed solvents containing carbonates are preferred, and mixed solvents of cyclic carbonates with acyclic carbonates or mixed solvents of cyclic carbonates with ethers are more preferred.

Among the mixed solvents of cyclic carbonates with acyclic carbonates, those which contain ethylene carbonate, dimethyl carbonate and ethyl methyl carbonate are preferred because they have a wide operating temperature range, are excellent in loading characteristics and are hardly decomposed even when graphite materials, such as natural graphite and artificial graphite, are used as the active material of negative electrode.

Further, in point of giving a particularly excellent safety improving effect, the use of those electrolytes is preferred which contain a fluorine-containing lithium salt, such as $LiPF_6$, and/or an organic solvent containing a fluorine substituent. Mixed solvents containing ethers having a fluorine substituent, such as pentafluoropropyl methyl ether and 2,2,3,3-tetrafluoropropyl difluoromethyl ether, and dimethyl carbonate are more preferred because they are excellent also in high-current discharging characteristics.

As to solid electrolytes, there may be used such polymer electrolytes as high molecular compounds of polyethylene oxide type and high molecular compounds containing at least one of the polyorganosiloxane chain and polyoxyalkylene chain. There may also be used so-called gel type electrolytes comprising a polymer and a non-aqueous electrolyte solution held therein. In some cases, safety can be improved when sulfide type electrolytes, such as $Li_2S$—$SiS_2$, $Li_2S$—$GeS_2$, $Li_2S$—$P_2S_5$ and $Li_2S$—$B_2S_3$, or inorganic compound type electrolytes containing sulfides, such as $Li_2S$—$SiS_2$—$Li_3PO_4$ and $Li_2S$—$SiS_2$—$Li_2SO_4$, are used.

The shape of the non-aqueous secondary battery of this invention is not particularly limited, and may of the paper type, coin type, cylindrical type, rectangular type, etc.

As the outer casing of the battery, there may be used, beside a metal hard case which doubles as the negative electrode or positive electrode terminal, a bag-formed package formed of a laminate sheet comprising aluminum, or the like.

EXAMPLES

This invention is described in more detail with reference to Examples, but the invention is in no way limited thereto. Unless stated otherwise, the electrodes and flat plate type batteries for charging-discharging tests were prepared by the following method.

(1) Preparation of Electrodes and Flat Plate Type Batteries for Charging-Discharging Test To a mixture of a positive electrode active material and acetylene black of a conductive material was added as a binder a solution of PVDF in 1-methyl-2-pyrrolidone (hereinafter sometimes referred to as "NMP") so as to give a proportion of active material:conductive material:binder of 86:10:4 (weight ratio), the resulting mixture was kneaded to form a paste, the paste was coated on #100 stainless steel mesh, which was to constitute a positive electrode current collector, and dried under reduced pressure at 150° C. for 8 hours, to obtain a positive electrode.

The positive electrode obtained above was combined with a solution obtained by dissolving $LiPF_6$ in a liquid mixture of ethylene carbonate (hereinafter sometimes referred to as EC), dimethyl carbonate (hereinafter sometimes referred to as "DMC") and ethyl methyl carbonate (hereinafter sometimes referred to as "EMC") of a volume ratio of 30:35:35 to give a $LiPF_6$ concentration of 1 mole/l, as an electrolyte (hereinafter sometimes referred to as "$LiPF_6$/EC+DMC+EMC"), polypropylene porous membrane as a separator and metallic lithium as a negative electrode, whereby a flat plate type battery was prepared.

(2) Powder X-Ray Diffraction Measurement (2-1) Measurement Conditions in Examples 1, 2, 3 and 4 and Comparative Example 1

Measurement was made with RU200 system (a trade name, mfd. by Rigaku Corporation, Japan) under the following conditions.

X-ray: $CuK_\alpha$
Voltage-Current: 40 kV-30 mA
Measurement angle range: 2θ = 10-90°
Slit: DS-1°, RS-0.3 mm, SS-1°
Step: 0.02°

(2-2) Measurement Conditions in Examples 5, 6 and 7

Measurement was made with Type RINT (a trade name, mfd. by Rigaku Corporation, Japan)

X-ray: $CuK_\alpha$
Voltage-Current: 40 kV-140 mA
Measurement angle range: 2θ = 10-90°
Slit: DS-1°, RS-0.3 mm, SS-1°
Step: 0.02°

Example 1

(1) Synthesis of Positive Electrode Active Material

Figure 2:
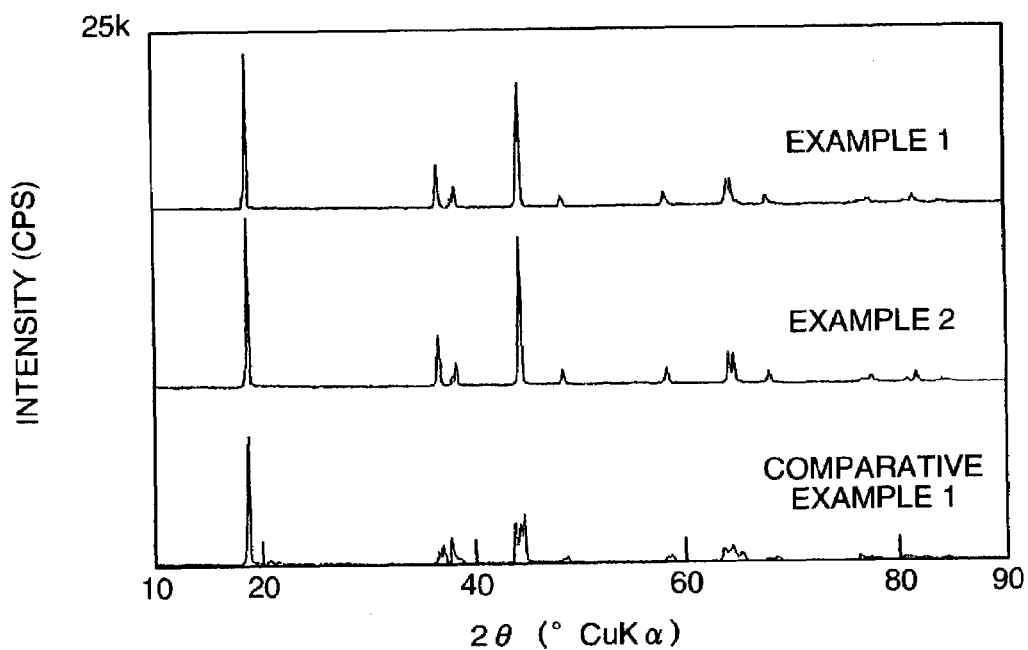
FIG. 2 is a graph showing the results of powder X-ray diffraction measurement in Examples 1 and 2 and Comparative Example 1.

Dinickel trioxide (mfd. by Hayashi Pure Chemical Industries Ltd., Japan, nickel content 73.4% by weight; BET specific surface area 134 m²/g; powder X-ray diffraction measurement result is shown in FIG. 1), manganese carbonate (mfd. by Wako Pure Chemical Industries Ltd., Japan, guaranteed reagent, manganese content 46.4% by weight) and lithium hydroxide (mfd. by The Honjo Chemical Corporation, Japan) were weighed out in a molar ratio of respective elements, Li:Ni:Mn, of 1.0:0.5:0.5, and were then thoroughly mixed in a mortar. The powder mixture thus obtained was placed in a box type furnace and was fired by keeping it in the air at 1000° C. for 15 hours, to obtain a positive electrode active material E1 for non-aqueous secondary battery (a material corresponding, in the composition formula (I), to a case wherein x=0.5 and y=0, namely $Li[Ni_{0.5}Mn_{0.5}]O_2$). The result of powder X-ray diffraction measurement of the electrode material E1 is shown in FIG. 2. It was confirmed that the material E1 had a layered structure identical with that reported by Ohzuku et al. (Chemistry Letters, 744 (2001)).

(2) Charging-Discharging Performance Evaluation in a Case Where the Active Material E1 Was Used as the Positive Electrode Active Material of Lithium Secondary Battery.

A flat plate type battery was prepared by using the compound particles E1 obtained above, and subjected to a charging-discharging test based on constant-current constant-voltage charging and constant-current discharging under the following conditions.

Maximum charging voltage 4.3V, Charing time 8 hours, Charging current 0.5 mA/cm², Minimum discharging voltage 3.0V, Discharging current 0.5 mA/cm², and Charging-discharging temperature 25° C.

Figure 3:
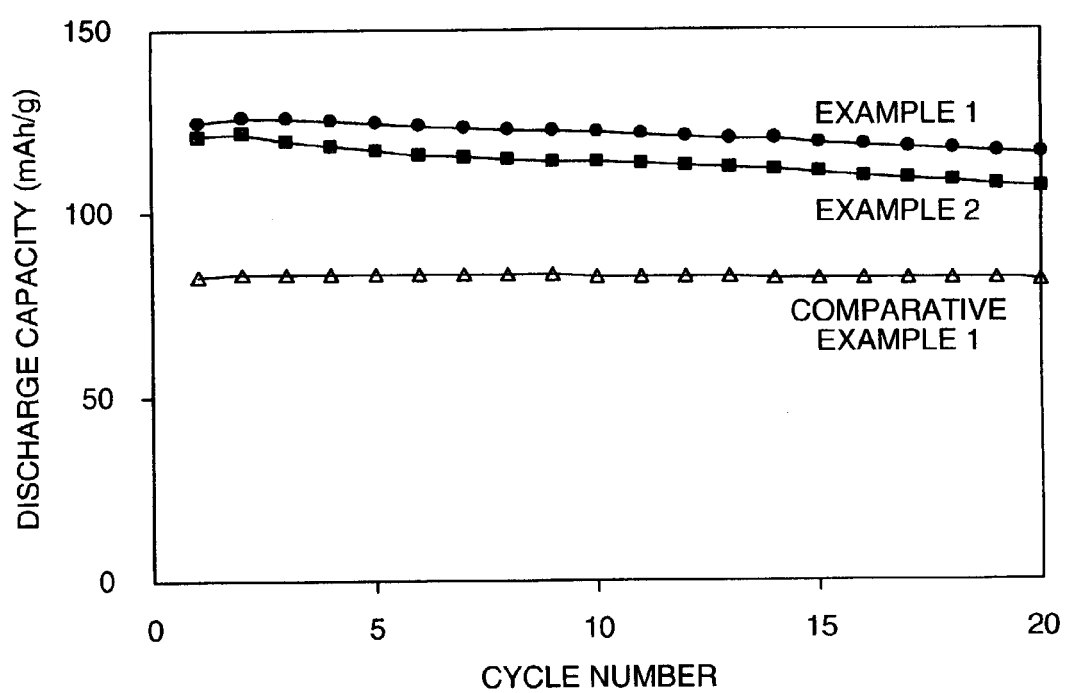
FIG. 3 is a graph showing the cycle changes of discharging capacity in Examples 1 and 2 and Comparative Example 1.

The change of discharging capacity is shown in FIG. 3. The discharging capacities at the 10th cycle and the 20th cycle were respectively 123 and 117 mAh/g, which are higher than the corresponding capacities obtained by using spinel type lithium manganese oxide, thus showing good cycle characteristics.

Example 2

(1) Synthesis of Positive Electrode Active Material

The same procedures as in Example 1 were followed except for using dimanganese trioxide (mfd. by Kojundo Chemical Laboratory Co., Ltd., Japan, purity 99.9% by weight) as the manganese starting material, to obtain a positive electrode material E2 for non-aqueous secondary battery. The result of powder X-ray diffraction measurement of the material E2 is shown in FIG. 2. It was confirmed that the material E2 also had a layered structure identical with that reported by Ohzuku et al.

(2) Charging-Discharging Performance Evaluation in a Case Where the Active Material E2 Was Used as the Positive Electrode Active Material of Lithium Secondary Battery A flat plate type battery was prepared by using the compound particles E2 obtained above, and subjected to a charging-discharging test in the same manner as in Example 1.

The change of discharging capacity is shown in FIG. 3. The discharging capacities at the 10th cycle and the 20th cycle were respectively 115 and 108 mAh/g.

Example 3

(1) Synthesis of Positive Electrode Active Material

Figure 4:
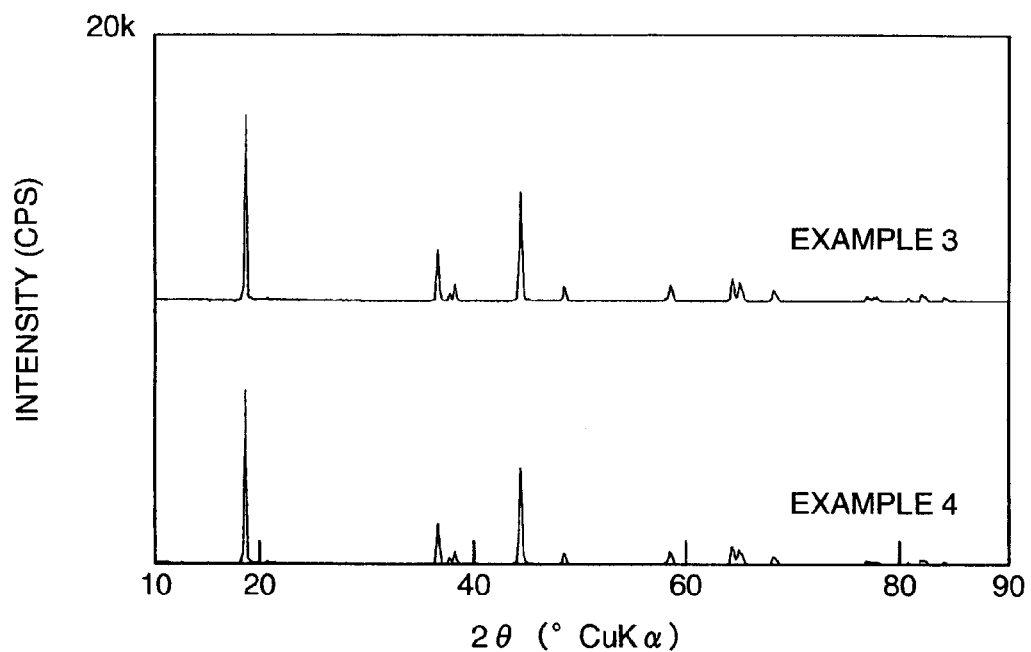
FIG. 4 is a graph showing the results of powder X-ray diffraction measurement in Examples 3 and 4.

Dinickel trioxide (mfd. by Hayashi Pure Chemical Industries Ltd., Japan, nickel content 73.4% by weight; BET specific surface area 134 m$^2$/g; powder X-ray diffraction measurement result is shown in FIG. 1), tricobalt tetroxide (mfd. by Nihon Kagaku Sangyo Co., Ltd., Japan, Product name of PRM-73; cobalt content 72.8% by weight), manganese dioxide (mfd. by Kojundo Chemical Laboratory Co., Ltd., Japan, 2N grade reagent) and lithium hydroxide (mfd. by The Honjo Chemical Corporation, Japan) were weighed out in a molar ratio of respective elements, Li:Ni:Mn:Co, of 1.04:0.34:0.42:0.20, and were then thoroughly mixed in a mortar. The powder mixture thus obtained was placed in a box type furnace and was fired by keeping it in the air at 1000° C. for 15 hours, to obtain a positive electrode active material E3 for non-aqueous secondary battery (a material corresponding, in the composition formula (I), to a case wherein x=0.44 and y=0.10, namely Li[Ni$_{0.34}$Li$_{0.04}$Mn$_{0.42}$Co$_{0.20}$]O$_2$). The result of powder X-ray diffraction measurement of the electrode material E3 is shown in FIG. 4. It was confirmed that the material E3 had a layered structure identical with that reported by Ohzuku et al.

(2) Charging-Discharging Performance Evaluation in a Case Where the Active Material E3 Was Used as the Positive Electrode Active Material of Lithium Secondary Battery.

A flat plate type battery was prepared by using the compound particles E3 obtained above, and subjected to a charging-discharging test in the same manner as in Example 1.

Figure 5:
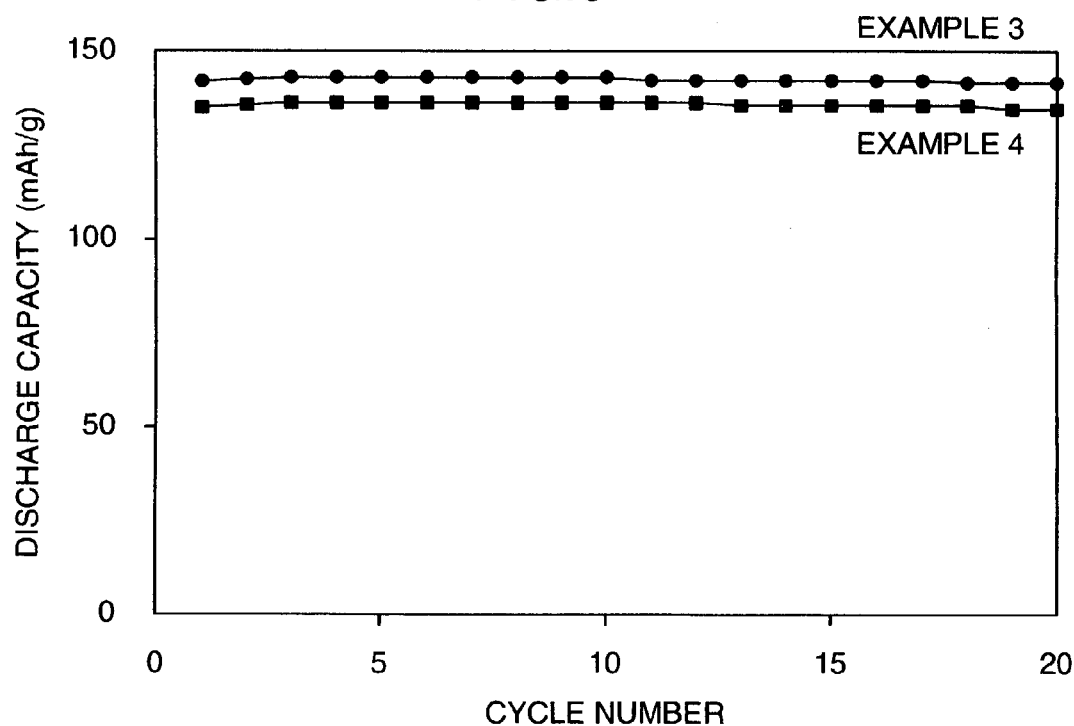
FIG. 5 is a graph showing the cycle changes of discharging capacity in Examples 3 and 4.

The change of discharging capacity is shown in FIG. 5. The discharging capacities at the 10th cycle and the 20th cycle were respectively 143 and 142 mAh/g.

Example 4

(1) Synthesis of Positive Electrode Active Material

The same procedures as in Example 3 were followed except that the powder mixture was fired at 950° C., to obtain a positive electrode material E4 for non-aqueous secondary battery. The result of powder X-ray diffraction measurement of the material E4 is shown in FIG. 4. It was confirmed that the material E4 also had a layered structure identical with that reported by Ohzuku et al.

(2) Charging-Discharging Performance Evaluation in a Case Where the Active Material E4 Was Used as the Positive Electrode Active Material of Lithium Secondary Battery A flat plate type battery was prepared by using the compound particles E4 obtained above, and subjected to a charging-discharging test in the same manner as in Example 1.

The change of discharging capacity is shown in FIG. 5. The discharging capacities at the 10th cycle and the 20th cycle were respectively 135 and 134 mAh/g.

Comparative Example 1

(1) Synthesis of Positive Electrode Active Material

The same procedures as in Example 1 were followed except for using nickel hydroxide (mfd. by Tanaka Chemical Corporation, Japan, nickel content 61.8% by weight) as the nickel starting material, to obtain a positive electrode material C1 for non-aqueous secondary battery. The result of powder X-ray diffraction measurement of the material C1 is shown in FIG. 2. It was observed that the material C1 showed, beside the layered structure identical with that reported by Ohzuke et al., diffraction peaks due to NiO and Li$_2$MnO$_3$.

(2) Charging-Discharging Performance Evaluation in a Case Where the Active Material C1 Was Used as the Positive Electrode Active Material of Lithium Secondary Battery A flat plate type battery was prepared by using the compound particles C1 obtained above, and subjected to a charging-discharging test in the same manner as in Example 1.

The change of discharging capacity is shown in FIG. 3. The discharging capacities at the 10th cycle and the 20th cycle were low, respectively 84 and 83 mAh/g.

Example 5

(1) Synthesis of Positive Electrode Active Material

Figure 6:
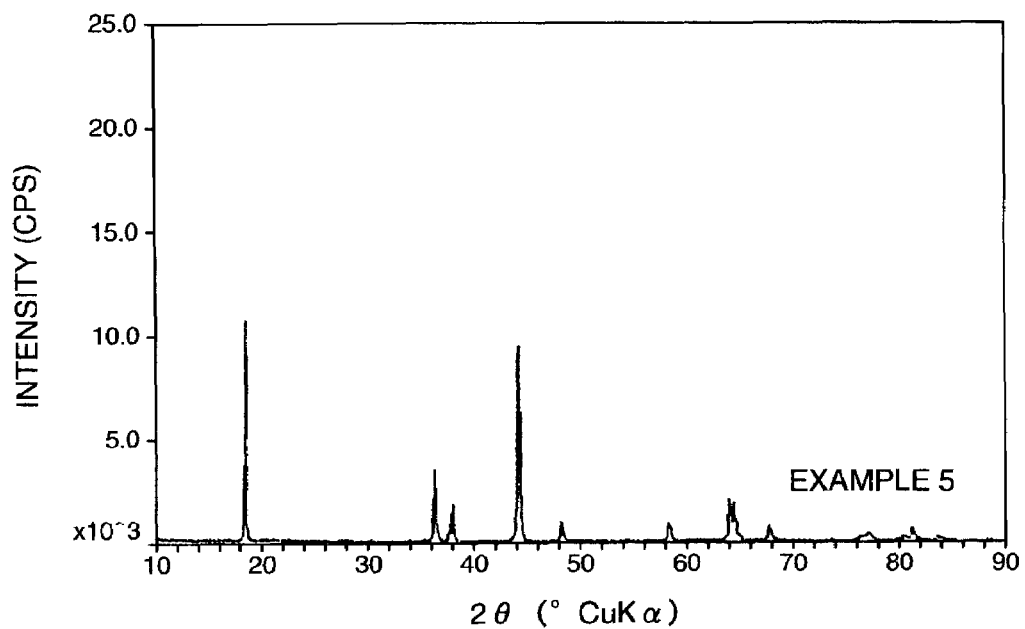
FIG. 6 is a graph showing the result of powder X-ray diffraction measurement in Example 5.

Lithium hydroxide (mfd. by The Honjo Chemical Corporation, Japan), nickel hydroxide (mfd. by Tanaka Chemical Corporation, Japan, nickel content 61.8% by weight), manganese carbonate (mfd. by Wako Pure Chemical Industries Ltd., Japan, guaranteed reagent, manganese content 46.4% by weight), and boric acid (H$_3$BO$_3$, mfd. by Wako Pure Chemical Industries Ltd., Japan), were weighed out in a molar ratio of respective elements, Li:Ni:Mn:B, of 1.0:0.5:0.5:0.02, and were then thoroughly mixed in a mortar. The powder mixture thus obtained was placed in a box type furnace and was fired by keeping it in the air at 1000° C. for 15 hours, to obtain a positive electrode active material E5 for non-aqueous secondary battery (a material corresponding, in the composition formula (I), to a case wherein x=0.5 and y=0, namely a compound represented by the composition formula Li[Ni$_{0.5}$Mn$_{0.5}$]O$_2$. The combination of the starting materials of this example corresponds to that of Comparative Example 1 except that the boric acid was combined. The result of powder X-ray diffraction measurement of the material E5 is shown in FIG. 6. It was confirmed that the material E$_5$ had a layered structure identical with that reported by Ohzuku et al.

(2) Charging-Discharging Performance Evaluation in a Case Where the Active Material E5 Was Used as the Positive Electrode Active Material of Lithium Secondary Battery A flat plate type battery was prepared by using the active material E5 and subjected to a charging-discharging test in the same manner as in Example 1.

Figure 7:
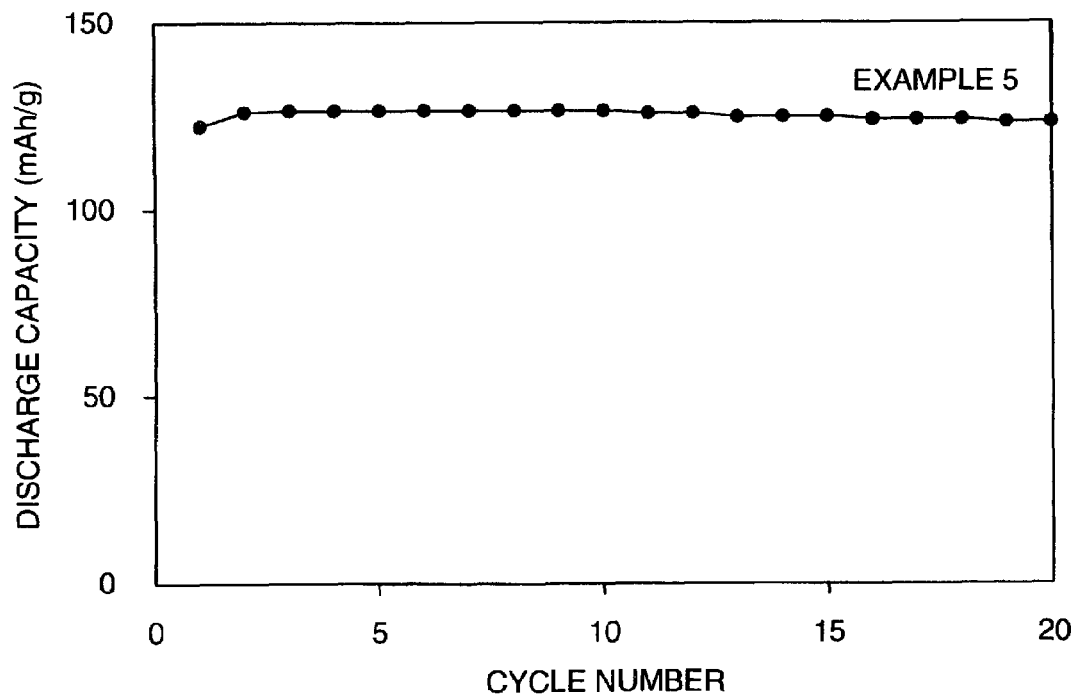
FIG. 7 is a graph showing the cycle change of discharging capacity in Example 5.

The change of discharging capacity is shown in FIG. 7. The discharging capacities at the 10th cycle and the 20th cycle were respectively 127 and 124 mAh/g, which are higher than the corresponding capacities obtained by using spinel type lithium manganese oxide, thus showing good cycle characteristics.

Example 6

(1) Synthesis of Positive Electrode Active Material

Figure 8:
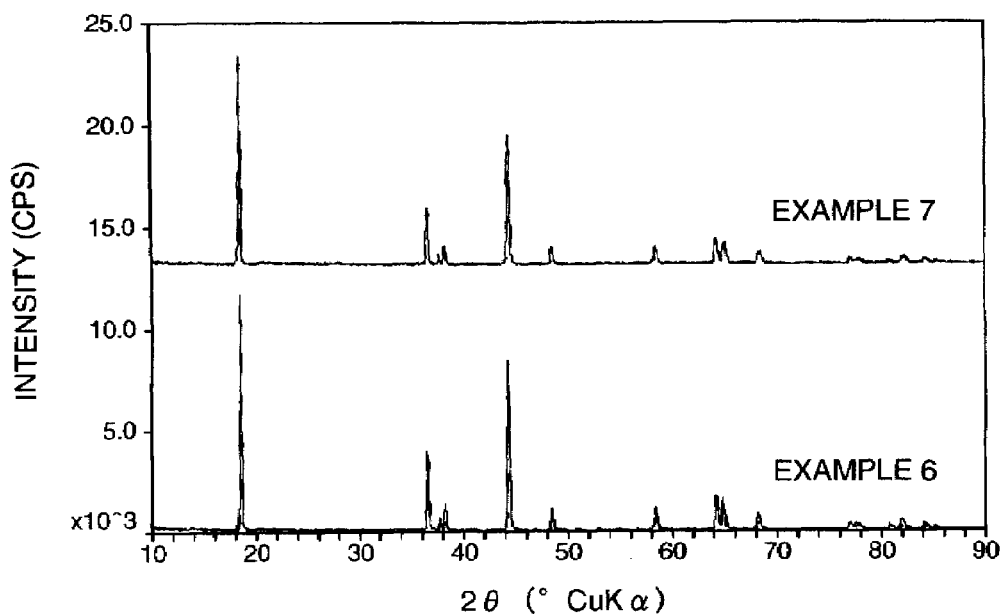
FIG. 8 is a graph showing the results of powder X-ray diffraction measurement in Examples 6 and 7.

The same procedures as in Example 3 were followed except that a molar ratio of respective elements were weighed out, Li:Ni:Mn:Co, of 1.00:0.40:0.40:0.20, and obtained a positive electrode active material E6 for non-aqueous secondary battery (a material corresponding, in the composition formula (I), to a case wherein x=0.50 and y=0.10, namely Li[Ni$_{0.40}$Mn$_{0.40}$Co$_{0.20}$]O$_2$. The result of powder X-ray diffraction measurement of the material E6 is shown in FIG. 8. It was confirmed that the material E6 had a layered structure identical with that reported by Ohzuku et al.

(2) Charging-Discharging Performance Evaluation in a Case Where the Active Material E6 Was Used as the Positive Electrode Active Material of Lithium Secondary Battery A flat plate type battery was prepared by using the active material E6 and subjected to a charging-discharging test in the same manner as in Example 1.

Figure 9:
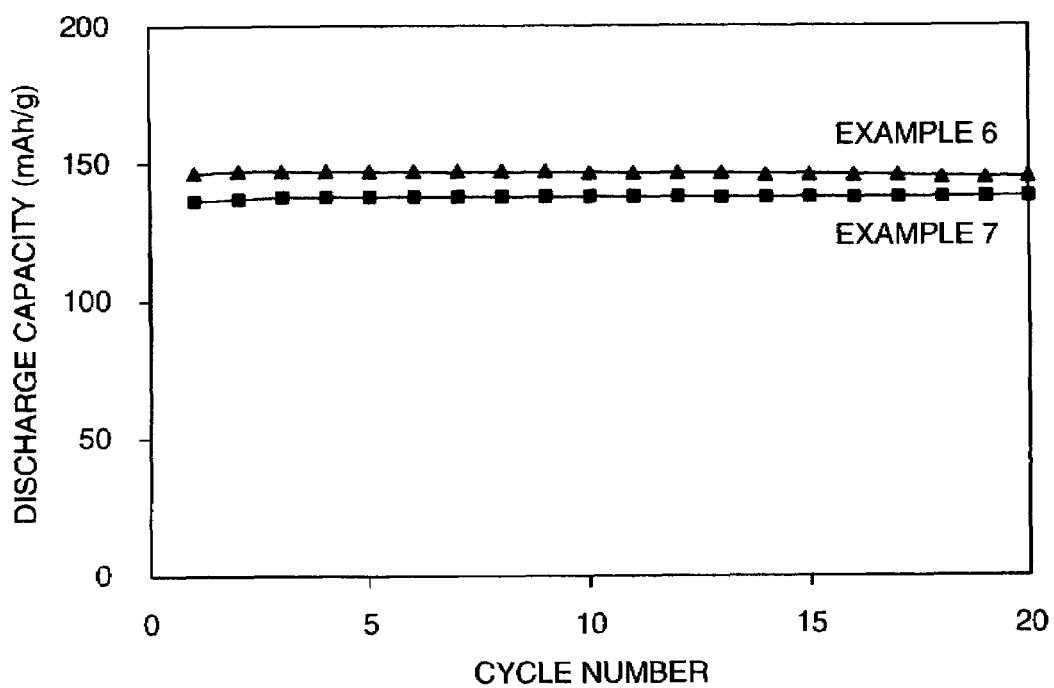
FIG. 9 is a graph showing the cycle changes of discharging capacity in Examples 6 and 7.

The change of discharging capacity is shown in FIG. 9. The discharging capacities at the 10th cycle and the 20th cycle were respectively 147 and 144 mAh/g.

Example 7

(1) Synthesis of Positive Electrode Active Material

The same procedures as in Example 3 were followed except that a molar ratio of respective elements were weighed out, Li:Ni:Mn:Co, of 1.06:0.31:0.43:0.20, and obtained a positive electrode active material E7 for non-aqueous secondary battery (a material corresponding, in the composition formula (I), to a case wherein x=0.41 and y=0.10, namely Li[Ni$_{0.31}$Li$_{0.06}$Mn$_{0.43}$Co$_{0.20}$]O$_2$. The result of powder X-ray diffraction measurement of the material E7 is shown in FIG. 8. It was confirmed that the material E7 had a layered structure identical with that reported by Ohzuku et al.

(2) Charging-Discharging Performance Evaluation in a Case Where the Active Material E7 Was Used as the Positive Electrode Active Material of Lithium Secondary Battery A flat plate type battery was prepared by using the active material E7 and subjected to a charging-discharging test in the same manner as in Example 1.

The change of discharging capacity is shown in FIG. 9. The discharging capacities at the 10th cycle and the 20th cycle were respectively 137 and 137 mAh/g.

Next, charging-discharging behavior of the compound particles of E3, E6 and E7 were investigated at 60° C. A flat type battery was prepared with a mixture solution of EC and EMC (1:1 volume ratio) in which LiPF$_6$ was dissolved to be 1 mol/l as an electrolyte instead of LiPF$_6$/EC+DMC+EMC, and subjected to a charging-discharging test in a thermostat maintained at 60° C.

Figure 10:
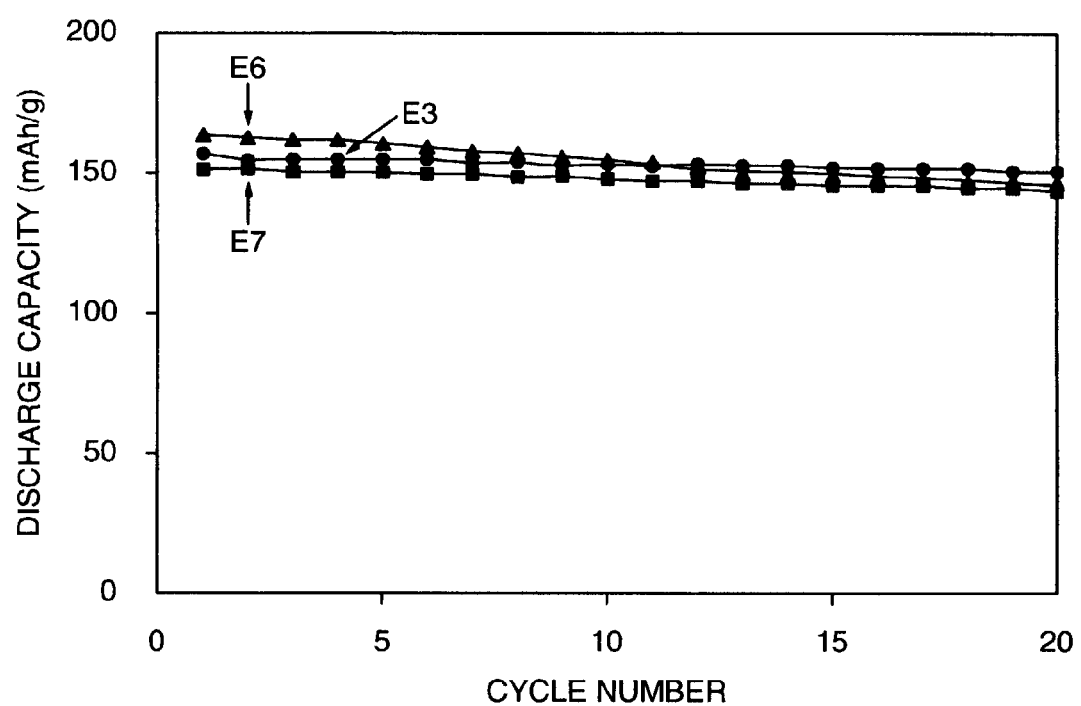
FIG. 10 is a graph showing the cycle changes of discharging capacity in Examples 3, 6 and 7.

The change of discharging capacity is shown in FIG. 10. The discharging capacities at the 10th cycle and the 20th cycle were respectively 154 and 151 mAh/g (E3); 155 and 147 mAh/g (E6) and 148 and 145 mAh/g (E7), thus showing good cycle characteristics of high capacities. E3 and E7, in which x<0.5, i.e., Ni content is smaller than Mn content was superior in cycle characteristics compared with E6, in which x=0.5, i.e., Ni content is equal to Mn content.

According to the method of this invention, a non-aqueous secondary battery positive electrode active material comprising lithium, nickel and manganese and having a layered structure can be prepared easily and simply, and a non-aqueous secondary battery using the active material has a high capacity. Accordingly, this invention is of great industrial value.

What is claimed is:

1. A method for preparing a positive electrode active material for a non-aqueous secondary battery comprising a step of firing a mixture of (1) at least one member selected from the group consisting of dinickel trioxide and boron compounds and (2) one or more metal compounds comprising lithium, nickel and manganese as their metal elements and a step of obtaining a compound comprising lithium, nickel and manganese and having a layered structure, wherein the compound comprising lithium, nickel and manganese and having a layered structure is a compound which is identified in X-ray diffraction as a compound represented by the composition formula Li[Ni$_{(x-y)}$Li$_{(1/3-2x/3)}$Mn$_{(2/3-x/3-y)}$Co$_{2y}$]O$_2$, wherein 0<x≦0.5, 0≦y≦1/6 and x>y, and wherein the mixture is obtained by a dry mixing method.

2. The method according to claim 1 wherein the compound comprising lithium, nickel and manganese and having a layered structure is a compound which is identified in X-ray diffraction as a compound represented by the composition formula Li[Ni$_{(x-y)}$Li$_{(1/3-2x/3)}$Mn$_{(2/3-x/3-y)}$Co$_{2y}$]O$_2$, wherein 0.4<x<0.5, 0<y≦1/6, and having a layered structure.

3. A method for preparing a positive electrode active material for a non-aqueous secondary battery comprising a step of firing a mixture of (1) dinickel trioxide and (2) one or more metal compounds comprising lithium, nickel and manganese as their metal elements and a step of obtaining a compound comprising lithium, nickel and manganese and having a layered structure, and wherein the compound comprising lithium, nickel and manganese and having a layered structure is a compound which is identified in X-ray diffraction as a compound represented by the composition formula Li[Ni$_{(x-y)}$Li$_{(1/3-2x/3)}$Mn$_{(2/3-x/3-y)}$Co$_{2y}$]O$_2$, wherein 0<x≦0.5, 0≦y≦1/6 and x>y.

4. The method according to claim 1 wherein said at least one member selected from the group consisting of dinickel trioxide and boron compounds is a boron compound.

5. The method according to claim 4 wherein said boron compound is selected from the group consisting of diboron trioxide, boric acid (orthoboric acid), metaboric acid, tetraboric acid, lithium borate and boron of simple body.

6. The method according to claim 5 wherein said boron compound is boric acid (orthoboric acid).

7. The method for preparing a positive electrode active material for a non-aqueous secondary battery according to claim 1, wherein the metal compound is selected from the group comprising lithium, nickel and manganese, and wherein the lithium, nickel and manganese are substantially free of complex hydroxides.

* * * * *